(12) United States Patent
Donnini et al.

(10) Patent No.: US 11,286,976 B2
(45) Date of Patent: Mar. 29, 2022

(54) AXIALLY HYPERSTATIC SYSTEM SOFTENER

(71) Applicant: GE Avio S.r.l., Rivalta di Torino (IT)

(72) Inventors: Andrea Donnini, Rome (IT); Ivan Borra, Cuneo (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/014,189

(22) Filed: Sep. 8, 2020

(65) Prior Publication Data

US 2021/0079951 A1    Mar. 18, 2021

(51) Int. Cl.
| | | |
|---|---|---|
| *F16C 19/18* | (2006.01) | |
| *F16C 25/08* | (2006.01) | |
| *F16C 19/06* | (2006.01) | |
| *F16C 19/16* | (2006.01) | |

(52) U.S. Cl.
CPC .............. *F16C 19/06* (2013.01); *F16C 19/18* (2013.01); *F16C 25/083* (2013.01); *F16C 19/163* (2013.01)

(58) Field of Classification Search
CPC ........ F16C 19/06; F16C 19/163; F16C 19/18; F16C 19/181; F16C 19/26; F16C 19/28; F16C 23/08; F16C 23/083; F16C 2229/00; F16C 2360/23; F16C 2229/24; F16C 2361/65
See application file for complete search history.

(56) References Cited

U.S. PATENT DOCUMENTS

| | | | | |
|---|---|---|---|---|
| 3,003,836 A | * | 10/1961 | Hill .......................... | B21B 31/18 |
| | | | | 384/455 |
| 3,909,085 A | * | 9/1975 | Wilkinson ............ | F16C 19/183 |
| | | | | 384/517 |
| 5,117,704 A | | 6/1992 | Kish et al. | |
| 5,316,393 A | * | 5/1994 | Daugherty ............ | F16C 25/083 |
| | | | | 384/517 |
| 5,462,410 A | | 10/1995 | Smith et al. | |
| 5,887,984 A | * | 3/1999 | Duval .................. | F16C 33/7886 |
| | | | | 384/477 |
| 5,964,663 A | | 10/1999 | Stewart et al. | |
| | | (Continued) | | |

FOREIGN PATENT DOCUMENTS

| | | | | | |
|---|---|---|---|---|---|
| DE | 102009036303 A1 | * | 2/2011 | ........... | B62D 5/0448 |
| DE | 102010038715 A1 | * | 2/2012 | ............ | F16C 19/166 |
| | (Continued) | | | | |

OTHER PUBLICATIONS

Italian Search Report corresponding to Italian Application No. 201900016145 dated Jun. 2, 2020.

*Primary Examiner* — Phillip A Johnson
(74) *Attorney, Agent, or Firm* — Venable LLP; Michele V. Frank; Elizabeth C. G. Gitlin

(57) ABSTRACT

An axially hyperstatic system softener for a transmission comprising a static component and a rotatable component mounted to each other by a double ball bearing having an outer race and an inner race includes first and second biasing elements in a rigid sleeve with the outer race disposed between the first and second biasing elements. The rotatable component includes two shafts splined together with the static component mounted to one of the shafts by the bearing double ball bearing. A shim between one of the biasing elements and the sleeve enables tuning the softener.

20 Claims, 3 Drawing Sheets

(56) References Cited

U.S. PATENT DOCUMENTS

| | | | |
|---|---|---|---|
| 7,192,213 B2 | 3/2007 | Mermoz | |
| 8,356,768 B2 | 1/2013 | Stamps et al. | |
| 8,669,670 B2 | 3/2014 | Donnelly et al. | |
| 8,789,656 B2 | 7/2014 | Eccles et al. | |
| 9,546,694 B2 | 1/2017 | Julian | |
| 2008/0174191 A1* | 7/2008 | Matsubara | H02K 5/1732 310/89 |
| 2014/0345966 A1* | 11/2014 | Asakura | F16C 23/08 180/444 |
| 2019/0234496 A1* | 8/2019 | Nishimura | F16C 25/083 |

FOREIGN PATENT DOCUMENTS

| | | | |
|---|---|---|---|
| DE | 2011003251 A1 | 8/2012 | |
| DE | 102015222568 A1 | 5/2017 | |
| FR | 945171 A | 4/1949 | |
| GB | 2535201 A | 8/2016 | |
| RU | 2398976 C1 * | 9/2010 | F16C 25/06 |
| WO | 2015167893 A1 | 11/2015 | |

* cited by examiner

AXIALLY HYPERSTATIC SYSTEM SOFTENER

CROSS-REFERENCE TO RELATED APPLICATION(S)

This application claims priority to Italian Application No. 102019000016145, filed Sep. 12, 2019, which is incorporated herein by reference its entirety.

The project leading to this application has received funding from the Clean Sky 2 Joint Undertaking under the European Union's Horizon 2020 research and innovation program under grant agreement No. CS2-LPA-GAM-2018/2019-01.

TECHNICAL FIELD

The disclosure generally relates to a system for softening the effects of hyperstatic conditions in mechanical transmissions having static and rotating parts.

BACKGROUND

High torque through splined connections with friction creates a rigid axial connection between mating rotating elements. When these elements are already supported by a dedicated axial retention on their own (e.g. ball bearings), the additional axial connection creates a hyperstatic system which can overload static and rotating parts with external loads and especially so with a temperature effect.

It is known to manage hyperstatic systems by sizing the components to account for overload. For example, hyperstaticism and misalignment of static and rotating parts can be partially managed by thin large disks installed on the rotating parts (also known as flexible disc coupling or "flectors") connected to the system by means of splines centered with fitted pilot diameters.

BRIEF DESCRIPTION

In one aspect, the disclosure relates to a transmission having a static component and a rotatable component. The rotatable component is mounted to the static component for rotation about an axis by a bearing having an outer race and an inner race with balls or rollers between the outer and inner races. The outer race is mounted to the static component and the inner race is mounted to the rotatable component. A system softener is disposed in the static component wherein the outer race is disposed between first and second biasing elements in a rigid sleeve.

In another aspect, the disclosure relates to s system softener for a transmission having a static component and a rotatable component connected by a bearing subject to hyperstatic conditions. A rigid sleeve is adapted to be fixed with the static component and has first and second opposed walls. A linear stack of a shim and first and second biasing elements is disposed between the first and second opposed walls. A fixed portion of the bearing is disposed between the first and second biasing elements.

DETAILED DESCRIPTION OF THE INVENTION

Figure 1:
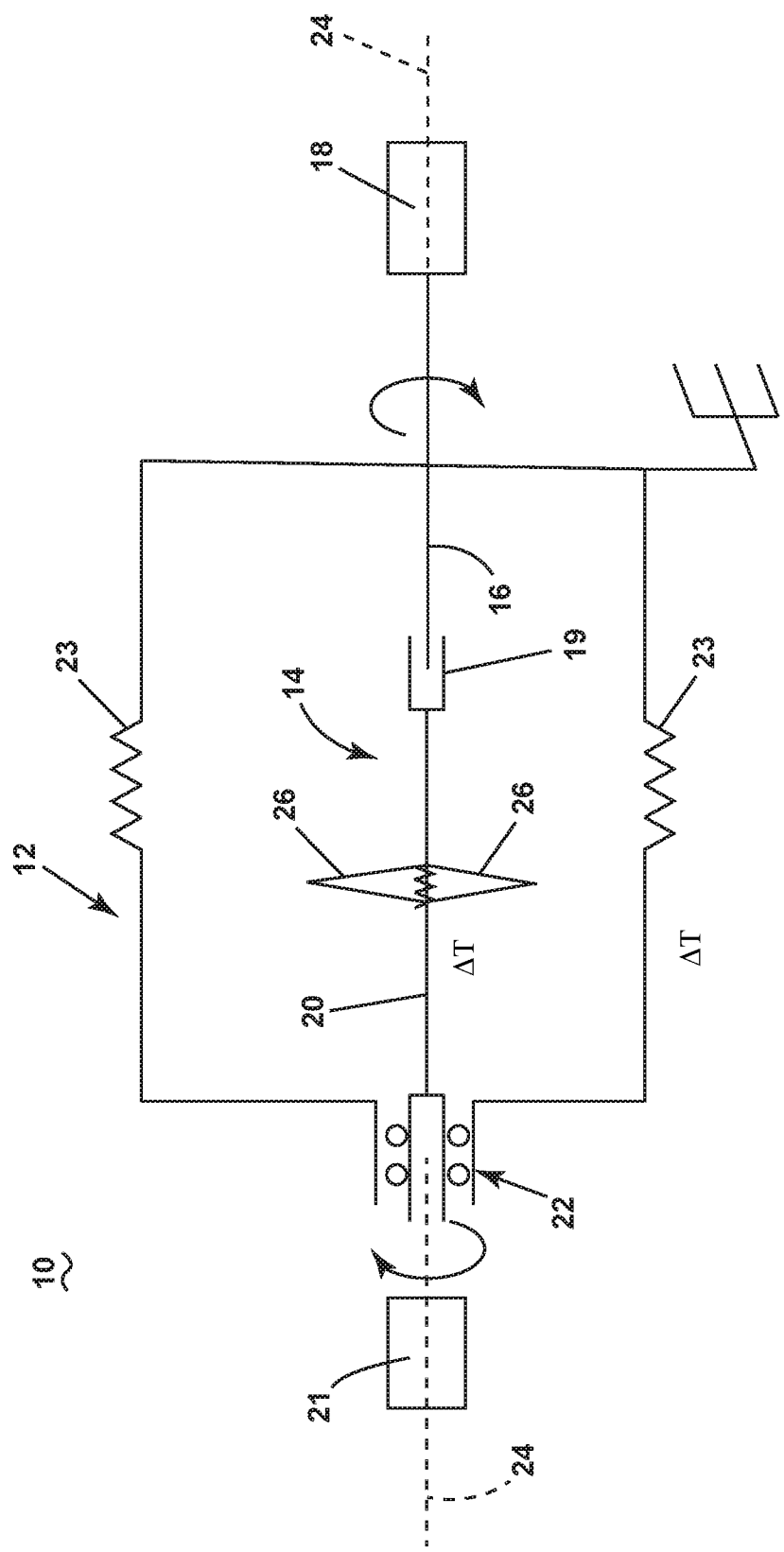
FIG. 1 is a schematic diagram illustrating prior art flectors to manage a hyperstatic system.

Aspects of the disclosure described herein are broadly directed to an apparatus for managing relative movement of static components to soften hyperstatic conditions in a mechanical transmission having static and rotating components. A structure or system is considered hyperstatic when the normal static equilibrium equations are inadequate to determine the internal forces and reactions on that structure or system. In other words, the structure or system is considered to be statically indeterminate. For the purposes of illustration, one exemplary environment in which a system or structure may become hyperstatic is a turboprop or rotorcraft where an elongated rotating shaft formed of two components splined together in a static housing is subject to high torque and a high temperature gradient.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates schematically one of the conventional solutions for managing hyperstatic conditions in a transmission 10. The transmission 10 comprises a static component 12 such as a housing and a rotatable component 14 such as a shaft. The rotatable component 14 comprises an input shaft 16 engaged with a driver 18 such as a gear box, for example, and an output shaft 20 engaged with an output load 21. The input shaft 16 is splined or otherwise fixed to the output shaft 20 at coupling 19. The housing 12 and the rotatable component 14 may have some natural, predictable inherent flexion represented in FIGS. 1 and 2 by reference 23. The rotatable component 14 is mounted to the static component by one or more bearings 22 for rotation about an axis 24 relative to the static component. In an environment where there is a thermal gradient between the static and rotatable components 12, 14, or where there is an external shock to one of the static or rotatable components 12, 14, or where there is a thermal gradient between driver 18 location and output 21 location, represented for example by AT, some axial movement of one relative to the other creates a hyperstatic system that can overload one or both of the static and rotatable components 12, 14. Prior art solutions include adding mass to the static or rotatable components 12, 14 to render them strong enough to absorb the hyperstaticism, or adding flectors 26 to the rotating component to absorb the hyperstaticism. Problems become apparent, however, with increased size and weight afforded to the first solution. Not only does it require added power to move the increased mass, it also affects the life of the components due to increased loads. The second solution illustrated in FIG. 1 is costly, difficult to manufacture, and requires monitoring. It also changes the dynamic behavior of the rotatable component 14.

Figure 2:
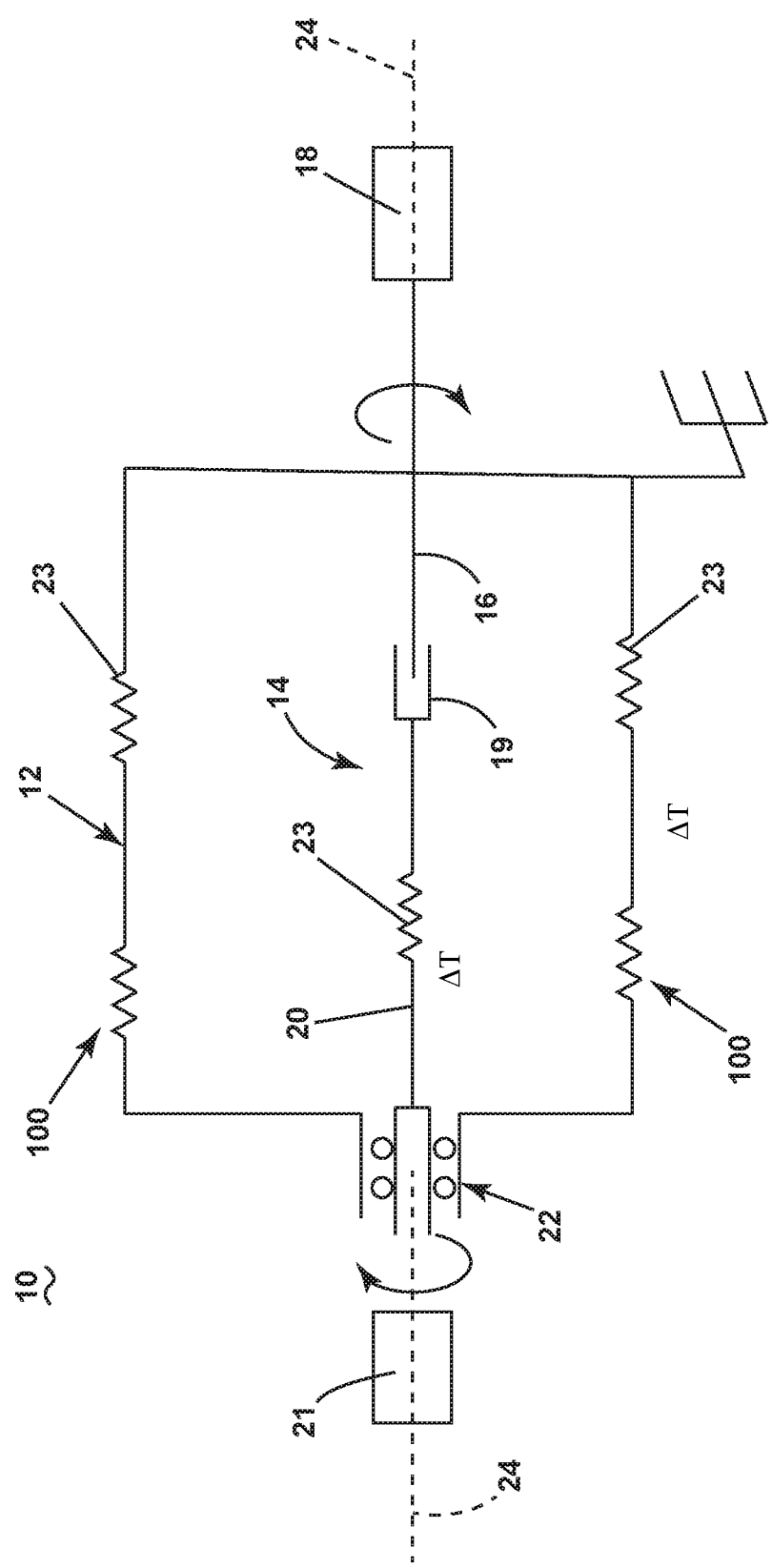
FIG. 2 is a schematic diagram of a softener for a hyperstatic system in accordance with various aspects described herein.

FIG. 2 schematically illustrates the same system as FIG. 1, but with the addition of an improvement as described in the embodiment herein. Like parts in FIGS. 1 and 2 will be referenced identically. It will be understood that in FIG. 2 there is no flexible disc coupling, and the mass of the components need not be increased to accommodate hyperstaticism. Rather, a tunable axial softener 100 is introduced to the static component 12 to account for a hyperstatic system.

Figure 3:
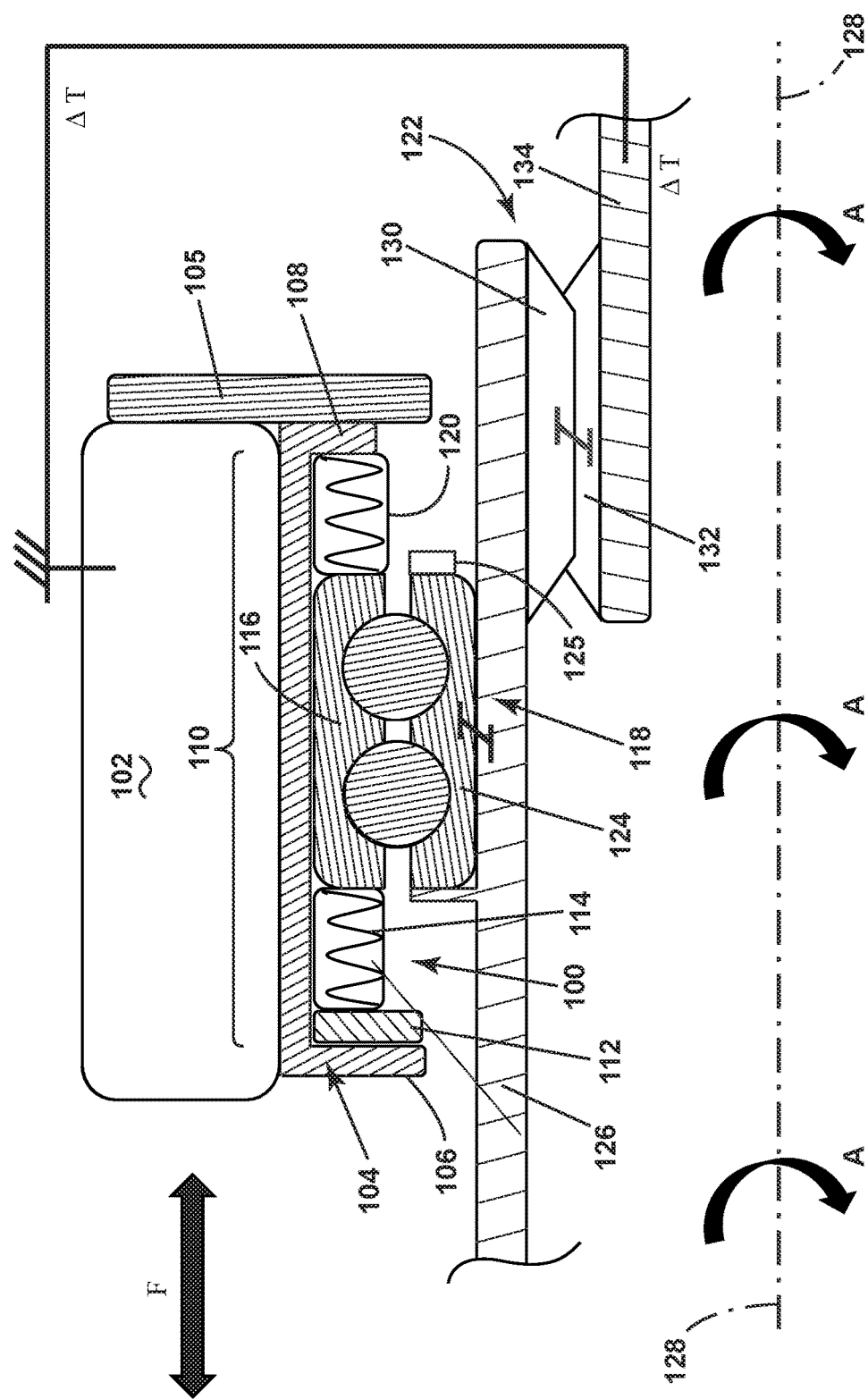
FIG. 3 is an embodiment of a softener for an axially hyperstatic system in accordance with various aspects described herein.

Looking now at the embodiment of FIG. 3, a static component 102, for example a housing, is preferably formed of a light alloy material. A rigid sleeve 104 is affixed to or part of the static component 102. The rigid sleeve 104 is preferably formed of steel and includes a first wall 106 and second wall 108 such that it forms a rigid case. The first or second walls 106, 108 may be integral with the rigid sleeve 104 or one or both may be a discrete axial retainer 105 extending from the static component 102 to allow installing components in the case (in this embodiment from right to left). The first and second walls 106, 108 constrain a stack 110 that includes the axial softener 100.

The stack comprises a shim 112 adjacent the first wall 106 for regulating spring package pre-load and range of action and to compensate manufacturing tolerances. Next to the shim 112 is first biasing element 114, such as a spring. Next to the first biasing element 114 is an outer race 116 of a bearing 118, such as a ball bearing or roller and ball combination. Preferably, the bearing 118 is a double row ball bearing. Finally, between the outer race 116 and the second wall 108 is a second biasing element 120, such as another spring. The shim 112 and the first and second biasing elements 114, 120 comprise the axial softener 100.

A rotatable component 122 includes an inner race 124 of the bearing 118, which is fixed to a first rotatable shaft 126 such as rotating flange, that rotates about an axis 128, for example, in the direction A. The first rotating shaft 126 typically has a series of first splines 130 that fixedly engage a series of second splines 132 on a second rotatable shaft 134 adapted to rotate about the axis 128. The splined engagement coupling of the first and second rotatable shafts 126, 134 completes the structure which, under torque consequent to a thermal gradient AT or an external shock F, may result in a hyperstatic system.

The first and second biasing elements 114, 120 enable controlled axial movement of the static component 102 relative to the rotatable component 122 in a hyperstatic condition. In other words, the structure avoids overload due to temperature effects and misalignments, and enables the use of smaller bearings, thinner static and rotating components and thus a globally lighter and more compact solution.

Preferably, the structure will operate in a wet environment to ease axial sliding of the static component 102 relative to the rotatable component 122 within a minimum radial clearance between the outer race 116 and an inner diameter of the rigid sleeve 104. A minimum clearance allows the system to misalign; therefore, a tight clearance is required in order not to introduce additional misalignment in the system with respect to actual applications. The embodiment disclosed herein is applicable to all shafts with pure torque transmission which can benefit from splitting the system into more than one shaft. It can be particularly useful in turboprop and rotorcraft applications since they typically utilize long shaft connections between areas which can experience high changes in temperature and where connecting flange axial displacement control (both directions) under external loads is required.

It will be understood that the disclosed structure is not used to obtain or manage bearing preload. Typically, in a bearing preload, the bearing contact angle is altered. Here, the system softener 100 allows relative controlled displacement between the static and rotatable components 102, 122 without altering the bearing contact angle. Bearing preload is accomplished by a combination of bearing internal geometry and axial pre-load achieved, for example, by stacking with a locknut 125 the bearing inner race 124 (split in two parts) tight on the rotatable shaft 126.

Among other technical benefits of the disclosed embodiment, the system is centered and displacement is controlled. It allows reverse thrust as an external load, and it can handle undetermined loads (according to the sizing of the first and second biasing elements 114, 120) because it does not affect or zero the bearing preload.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

For example, any combination of the following features is believed to contribute to the aforementioned technical benefits:

a system softener in the static component wherein the outer race is disposed between first and second biasing elements in a rigid case;

a shim between one of the first or second biasing elements and the rigid case;

the shim being sized to preload the first and second biasing elements;

the first and second biasing elements being sized to tune axial softening action;

the bearing being a double row ball bearing;

the bearing being a roller bearing;

the static component being formed of a light alloy material;

the static component being a housing;

the rotatable component including a first shaft fixed to a second shaft with the first shaft or the second shaft mounted to the static component;

the rotatable component including a first shaft fixed to a second shaft by splines;

the static component including the rigid case formed of steel and the system softener is constrained within the rigid case;

the system softener enabling axial movement of the static component relative to the rotatable component without changing a contact angle of the bearing;

the first and second biasing elements being springs;

the rigid case having first and second walls;

one of the walls of the rigid case being an axial retainer.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmission comprising:
a static component,
a rotatable component mounted to the static component for rotation about an axis by a bearing having an outer race and an inner race with one of balls or rollers between the outer and inner races, wherein the outer race is mounted to the static component and the inner race is mounted to the rotatable component, and
a system softener in the static component wherein the outer race is disposed between first and second biasing elements in a rigid case,
wherein the rotatable component includes a first shaft splined to a second shaft and the first shaft is mounted to the static component.

2. The transmission of claim 1 further comprising a shim between one of the first or second biasing elements and the rigid case.

3. The transmission of claim 2 wherein the shim is sized to preload the first and second biasing elements.

4. The transmission of claim 1 further comprising a shim, wherein the first and second biasing elements and the shim form an axial softener.

5. The transmission of claim 1 wherein the bearing is a double row ball bearing.

6. The transmission of claim 1 wherein the static component is formed of an alloy material.

7. The transmission of claim 1 wherein the static component includes the rigid case formed of steel and the system softener is constrained within the rigid case.

8. The transmission of claim 1 wherein the rigid case includes first and second walls and the system softener is constrained between the first and second walls.

9. The transmission of claim 1 wherein the system softener enables axial movement of the static component relative to the rotatable component without changing a contact angle of the bearing.

10. The transmission of claim 1 wherein the first and second biasing elements are springs.

11. A system softener for a transmission having a static component and a rotatable component connected by a bearing subject to hyperstatic conditions comprising:
a rigid case adapted to be fixed with the static component and having first and second opposed walls, and
a linear stack of a shim and first and second biasing elements between the first and second opposed walls, wherein a fixed portion of the bearing is disposed between the first and second biasing elements,
wherein the rotatable component includes a first shaft splined to a second shaft and the first shaft is mounted to the static component.

12. The system softener of claim 11 wherein the shim is sized to preload the first and second biasing elements.

13. The system softener of claim 11 wherein the first and second biasing elements and the shim form an axial softener.

14. The system softener of claim 11 wherein the bearing is a double row ball bearing.

15. The system softener of claim 11 wherein the static component is formed of an alloy material.

16. The system softener of claim 11 wherein the first and second biasing elements enable axial movement of the static component relative to the rotatable component without changing a contact angle of the bearing.

17. The system softener of claim 11 wherein the first and second biasing elements are springs.

18. A transmission comprising a static component and a rotatable component mounted to each other by a bearing having an outer race and an inner race with one of balls or rollers between the outer and inner races, wherein the outer race is mounted to the static component and the inner race is mounted to the rotatable component, characterized by:
a system softener in the static component wherein the outer race is disposed between first and second biasing elements in a rigid case,
wherein the rotatable component includes a first shaft splined to a second shaft and the first shaft is mounted to the static component.

19. The transmission of claim 18 wherein the system softener includes a shim between one of the first or second biasing elements and the rigid case.

20. The transmission of claim 18 wherein the first and second biasing elements enable axial movement of the static component relative to the rotatable component without changing a contact angle of the bearing.

* * * * *

UNITED STATES PATENT AND TRADEMARK OFFICE
CERTIFICATE OF CORRECTION

PATENT NO. : 11,286,976 B2  
APPLICATION NO. : 17/014189  
DATED : March 29, 2022  
INVENTOR(S) : Andrea Donnini et al.

Page 1 of 1

It is certified that error appears in the above-identified patent and that said Letters Patent is hereby corrected as shown below:

On the Title Page

Item (30) should be added as follows:

Item (30) Foreign Application Priority Data

Sep. 12, 2019 (Italy) 102019000016145

Signed and Sealed this  
Sixth Day of September, 2022

Katherine Kelly Vidal  
*Director of the United States Patent and Trademark Office*